United States Patent [19]

Burdick et al.

[11] 4,106,055
[45] Aug. 8, 1978

[54] AUTOMATIC COLOR LEVEL CONTROL SYSTEM WITH THRESHOLD TRACKING

[75] Inventors: Kenneth John Burdick, Wyoming; Douglas William Constable, Batavia; Robert Charles Wheeler, Elba, all of N.Y.

[73] Assignee: GTE Sylvania Incorporated, Stamford, Conn.

[21] Appl. No.: 813,086

[22] Filed: Jul. 5, 1977

[51] Int. Cl.² ............................................. H04N 9/537
[52] U.S. Cl. ...................................................... 358/27
[58] Field of Search ......................................... 358/27

[56] References Cited
U.S. PATENT DOCUMENTS

| | | | |
|---|---|---|---|
| 3,732,358 | 5/1973 | Harwood | 358/27 |
| 3,936,869 | 2/1976 | Jirka | 358/27 |
| 3,982,273 | 9/1976 | Cochran | 358/27 |

Primary Examiner—Richard Murray
Assistant Examiner—Joseph A. Orsino, Jr.
Attorney, Agent, or Firm—John A. Odozynski

[57] ABSTRACT

A DC controlled amplifier is used to control the chrominance gain, and hence the color saturation, of a television receiver. The voltage on the wiper of a Color Control variable resistor and the output of an Automatic Color Level (ACL) detector are combined in a summing network to provide a DC voltage to the controlled amplifier. The ACL detector develops an output voltage that tends to maintain the peak-to-peak chrominance signal, and therefore the color saturation, at or below a threshold level. A control tracking circuit varies the threshold level in accordance with the voltage on the wiper of the color control variable resistor, thereby maintaining the dynamic range of the Automatic Color Level Control System relatively independent of the setting of the Color Control.

14 Claims, 3 Drawing Figures

AUTOMATIC COLOR LEVEL CONTROL SYSTEM WITH THRESHOLD TRACKING

CROSS REFERENCE TO RELATED APPLICATIONS

K. J. Burdick et al, "Automatic Peaking Control Circuitry For a Video Processing System" (Ser. No. 760,366, filed Jan. 19, 1977; now U.S. Pat. No. 4,069,505 R. C. Wheeler, "Aperture Correction Circuitry For a Video Processing System," (Ser. No. 760,283, filed Jan. 11, 1977 now U.S. Pat. No. 4,080,627 and assigned to the same assignee as this invention.

FIELD OF THE INVENTION

This invention relates to color television receivers in general and automatic color level control systems in particular.

BACKGROUND OF THE INVENTION

It has long been a goal of color television designers to implement a system that automatically corrects errors in improperly modulated chrominance signals without introducing distortion during the reception of properly modulated signals. Empirical investigation has indicated than an Automatic Color Level System that is activated in response to chrominance signals having an amplitude corresponding to approximately 50% or more of maximum modulation level yields highly satisfactory results. When signal amplitudes reach a threshold level corresponding to the nominal peak-to-peak amplitude at 50% modulation, a peak detector develops a control voltage at the DC controlled amplifier in order to maintain the signal amplitude at that level. The controlled amplifier is almost universally followed by additional gain stages in the chrominance channels.

Although such an ACL system is capable of appreciable performance improvements, conventional embodiments are subject to the drawback described in the following simplified illustration:

Suppose the gain of the controlled amplifier varies from 0 to 10 decibels (dB) as the control voltage varies from 0 to 10 volts. Suppose, further, that the nominal output voltage is 1 volt and that the threshold is fixed at 2 volts. Let the normal gain of the amplifier stages following the controlled amplifier be such that the required gain of the controlled amplifier is 5 dB. The control voltage is then set for 5 volts and there is 5 dB gain variation available in either direction.

Now suppose that in a particular receiver, the gain of the chrominance amplifiers following the controlled amplifier is 3 dB lower than normal. In order to compensate, the gain of the controlled amplifier can be raised to 8 dB and its nominal output will now be 1.41 volts. Note that its output may only increase 42% (to 2 volts) before the threshold is reached and gain reduction occurs. On the other hand, if the gain following the controlled amplifier is 3 dB higher than normal, the nominal gain of the controlled amplifier will be reduced 3 dB and the normal output voltage will be 0.71 volts. The amplifier output may increase nearly 180% before the threshold is reached and gain reduction occurs. In the former situation, chrominance signals with the desired normal range of saturation will be subject to gain reduction. In the latter, over-saturated chrominance signals will not be gain reduced.

SUMMARY OF THE INVENTION

The above and other objects and advantages are achieved in one aspect of this invention by an automatic color level control system comprising a DC-controlled amplifier which provides an output to the receiver's chrominance channel. A detecting means is responsive to the output of the controlled amplifier and, together with a summing network comprising a variable control resistor and a discharge capacitor, develops a control voltage for the controlled amplifier whenever the amplifier's output exceeds a predetermined threshold level. A control tracking means is coupled between the summing network and detecting means so that the threshold level varies in accordance with the amplifier's control voltage.

DETAILED DESCRIPTION OF THE PREFERRED EMBODIMENT

For a better understanding of the present invention, together with other and further objects, advantages and capabilities thereof, reference is made to the following disclosure in conjunction with the accompanying drawing.

Figure 1:
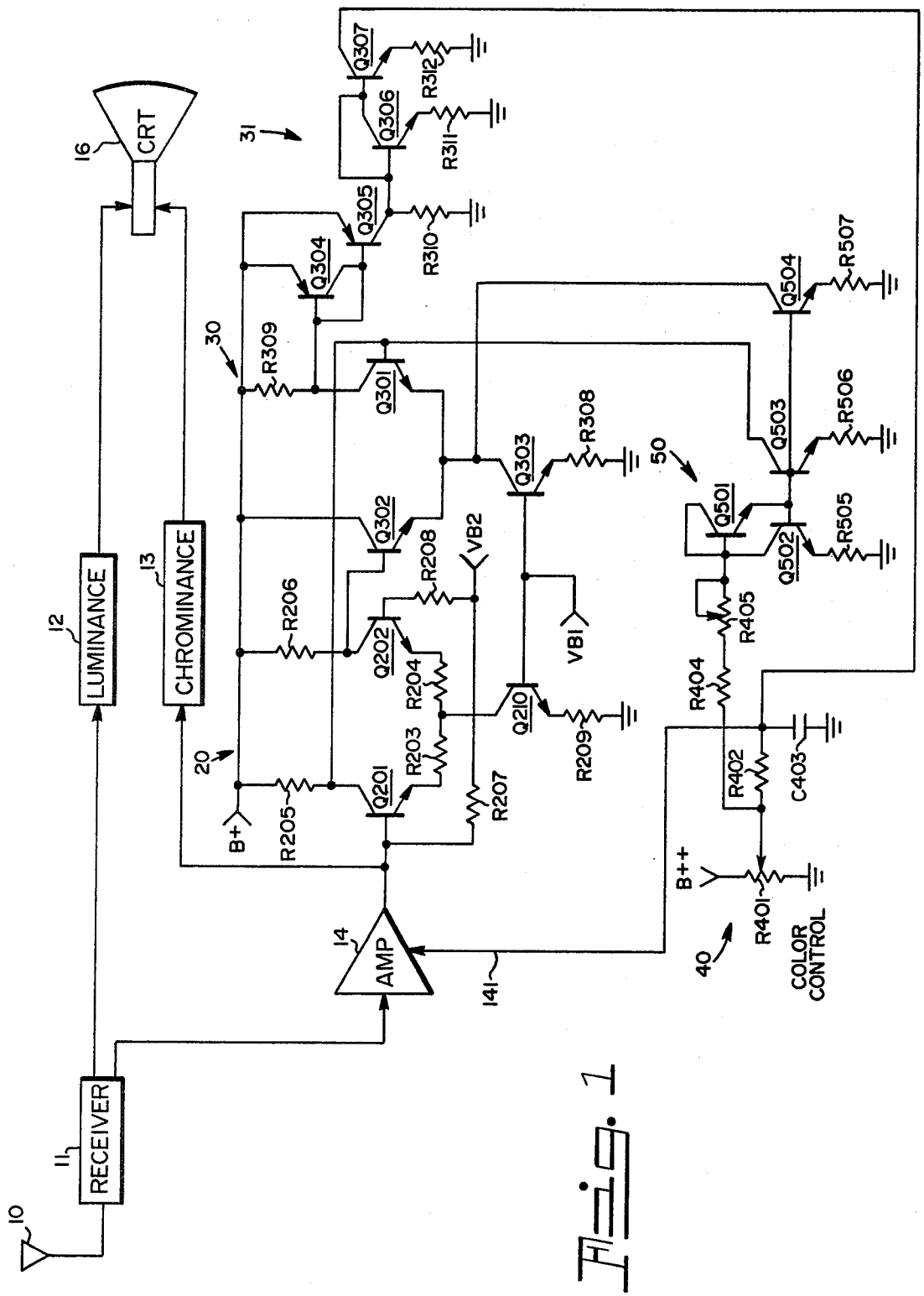
FIG. 1 is a schematic of the preferred embodiment of an automatic color level control system with threshold tracking.

Referring to FIG. 1, an antenna 10 intercepts a radio-frequency carrier signal modulated by a composite video signal containing chrominance and luminance information. The carrier signal is coupled to a receiver 11 where it is amplified, filtered, and demodulated. The receiver provides demodulated luminance information to a luminance channel 12 having an output coupled to a cathode ray tube 16. The receiver provides demodulated chrominance information to a DC-controlled amplifier 14. The output of amplifier 14 is further processed by a chrominance channel 13 and coupled to cathode ray tube 16.

Amplifier 14 may be of conventional construction, such as the commercially available integrated circuit, Motorola type MC1399. A significant feature of this amplifier is that it provides a peak-to-peak output voltage that is substantially linearly dependent on the DC voltage present at a control terminal 141.

Amplifier 14 has an output connected to a fixed-gain amplifier 20. Amplifier 20 comprises a differential amplifier consisting of transistors Q201 and Q202 and their respective emitter resistors R203 and R204. The collectors of transistors Q201 and Q202 are respectively connected through load resistors R205 and R206 to a source of potential voltage, B+. In a specific embodiment, 12 volts is a convenient value for this potential. Transistor Q210 with an emitter resistor R209 forms a source of current whose amplitude is determined by a bias source VB1. Base current to transistor Q201 and Q202 is provided by a second bias source, VB2, through resistors R207 and R208.

The output of amplifier 20, i.e., the differential voltage at the collectors of transistors Q201 and Q202, is coupled to a detecting means in the form of an Automatic Color Level (ACL) detector 30, comprising transistors Q301 and Q302 in a differential configuration.

The bases of transistors Q301 and Q302 are respectively coupled to the collectors of transistors Q201 and Q202. The collector of Q301 is coupled through a load resistor R309 to B+. Transistor Q303 and its emitter resistor R308 form a source of emitter current for transistors Q301 and Q302. The magnitude of this current is also determined by VB1.

ACL detector 30 further comprises a current amplifier 31 comprising transistors Q304, Q305, Q306, and Q307 and resistors R310, R311, R312. Current amplifier 31 has an input connected to load resistor R309 of transistor Q301 and an output connected to a summing network 40. As will be described in detail below, when the peak-to-peak chroma signal at the output of amplifier 14 exceeds a predetermined threshold level, the differential output of amplifier 20 will cause transistor Q301 of ACL detector 30 to conduct. Current pulses across R309 will be amplified by current amplifier 31. The output current of amplifier 31 will discharge capacitor C403 of summing network 40. the resulting lower voltage at terminal 141 will operate to maintain the peak-to-peak chroma output of amplifier 14 at or near the threshold level. As a result, it can be seen that the peak-to-peak output of amplifier 14 will be approximately linearly related to its peak-to-peak input signal as long as the output is below a threshold level. Once the magnitude of the input signal is such that the threshold is reached or exceeded, the automatic color level control system operates to maintain the output at the threshold level.

Summing network 40 further comprises a color control in the form of a variable control resistor R401, fixed resistors R402 and R404, and threshold adjust means in the form of a variable resistor R405. Variable control resistor R401 is connected between a source of potential B++ which may be 24 volts, and ground. Wiper arm of resistor R401 is coupled through resistor R402 to the DC control input of amplifier 14. Adjusting the wiper establishes the nominal control input voltage and, hence, the voltage gain of amplifier 14. The wiper is also coupled through resistors R404 and R405 to a control tracking means 50. Varying the resistance of R405 will vary the input current to the control tracking 50 and, as will be shown, the threshold level at which the automatic color level control system begins to operate.

Control tracking means 50 comprises transistors Q501, Q502, Q503 and Q504 as well as the associated emitter resistors R505, R506 and R507. Transistors Q502, Q503 and Q504 are connected in the conventional current-mirror configuration, thereby assuring substantially constant ratio of collector currents. Control tracking means 50 provides a first output, in the form of the collector current of Q503, to the base of Q301 and a second output, in the form of the collector current of Q504, in parallel with the collector current of Q303. The ratio of the collector currents of Q504 and Q503 is substantially constant and equal to (R506/R507).

Assume that R205 = R206 = 4 kilohms and that the values of VB1 and R209 are chosen so that the collector current of Q210 is 1 milliampere (ma). Under quiescent conditions Q201 and Q202 will share this current substantially equally. The DC collector voltage of Q202 will be 12v − (R206 × 0.5 ma) = 10v. However, the voltage drop across R205, and hence, the collector voltage of Q201, will be determined by the collector current of Q201 plus the current drawn by Q503 of control tracking means 30. If the voltage on the wiper of R401 is such that the collector current of Q503, as determined by R404, R405, R505 and R506 is 100 microamperes (μA), then the collector voltage of Q201 will be 12v − (R205 × 0.6 ma) = 9.6v (Note that Q502 and Q503 are in the conventional current mirror configuration so that their emitter, and consequently collector currents are of a constant ratio. For a given combined value of R404 and R405, the emitter current of Q503 is a function of the voltage on the wiper of R401 and the values of R505 and R506. R505 and R506 may be of equal value and in this embodiment may be 500 ohms.

The total emitter current of Q302 and Q301 is the sum of the collector currents of Q303 and Q504. For a given value of VB1, the collector current of Q303 will be (R209/R308) times the collector current of Q210. In this embodiment, 200 μA will be an appropriate value. Assume that R507 = 2 × (R506), and the current in the collector of Q502 is 100 μA, the collector current of Q504 will be 50 μA. The total emitter current of Q301 and Q302 will therefore be 250 μA.

If the voltages at the bases of Q301 and Q302 were equal, they would share the 250 μA equally. However, because the DC voltage at the base of Q302 is 0.4v greater than at the base of Q301, the entire 250 μA will flow through Q302. For the purposes of the following description assume that as long as the voltage at the base of Q302 is greater than at the base of Q301, Q302 will conduct the entire 250 μA. Conversely, when the voltage at the base of Q301 is greater than the voltage at the base of Q302, Q301 will conduct the entire 250 μA. (In practice, under those situations where these voltages are within approximately 100 mV of each other, Q301 and Q302 will share the total current).

The voltage gain of Q201 and Q202 is equal to (R205 + R206)/(R203 + R204). If R203 = R204 = 1K the amplifier will have a gain of 4. Assuming an output voltage of 100 mV peak-to-peak from amplifier 14, the collector voltage of Q202 will vary in the range of 10.0± 0.2 v or between 9.8 and 10.2 v. Similarly the collector voltage of Q201 will vary in the range of 9.6± 0.2v or between 9.4 and 9.8 volts. Because the collector voltage of Q201 is never greater than the collector voltage of Q202, Q301 will never conduct as long as the output voltage of amplifier 14 is less than 100 mV peak-to-peak.

Figure 2A:
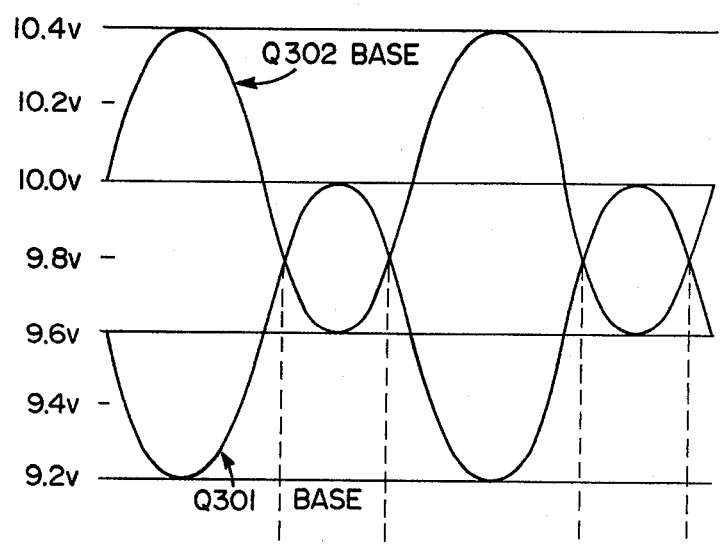
FIGS. 2a and 2b illustrate a particular signal waveform helpful in understanding the operation of the invention.
Figure 2B:
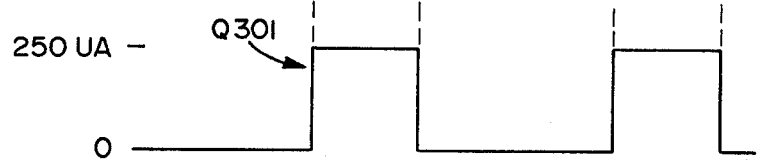

Now suppose the output voltage of amplifier 14 tends to become greater, say 200 mV peak-to-peak. The collector voltages of Q201 and Q202 will vary as shown in FIG. 2A. Note that whenever the voltage at the base of Q301 is greater than the voltage at the base of Q302, Q301 conducts as shown in FIG. 2B. For values of R309 sufficiently large, say 40 kilohms, substantially the entire 250 μA current will flow into the input of current amplifier 31, that is, the base-emitter junction of Q304. Because Q304 and Q305 are also constructed in a current mirror configuration, Q305 will conduct a substantially equal current. This current is amplified, approximately times 50, by Q306 and Q307. The output current of current amplifier 31, that is, the collector current of Q307 discharges C403, thereby reducing the voltage at terminal 141 of amplifier 14, and lowering its gain. In this manner the output of amplifier 14 is allowed to vary linearly with input signal level up to a threshold level, in this instance 100 mV peak-to-peak. For input signal exceeding this level, the gain of amplifier will be reduced so as to maintain the output at or near the threshold level. Of course this result could be achieved in one fashion with such nonlinear devices as diode limiters or clippers. However, the attendant waveform distortion would likely be intolerable or, at the least, undesirable.

Suppose now that it is desirable to double the gain of amplifier 14. If amplifier 14 has a linear gain-to-control voltage characteristic, this can be substantially achieved by doubling the voltage at the wiper of R401. This will result in double the input voltage to control tracking means 50 and, concomitantly, double the emitter current of Q502 and Q503 to approximately 200 μA. The collector voltage of Q201 will then become 12 v − (R205 × 0.7 ma) = 9.2v. From the example above it can be seen that the output of amplifier 14 will be able to increase to 200 mV peak-to-peak before ACL detector 30 begins to reduce the gain. The threshold level has increased in proportion to the desired gain of amplifier 14.

From the above it can be seen that the ACL detector operates as a peak-above-a-threshold detector. One measure of the quality of a conventional peak detector is a high charge-to-discharge ratio. That is, the ratio of charging that occurs during peak signal amplitude to the discharging that occurs when the signal amplitude is below the peak. Because in this embodiment capacitor C403 is discharged during peak signal conditions, the relevant criterion is the discharge-to-charge ratio. In this embodiment capacitor C403 is discharged in proportion to the collector current of Q301. It is charged by the current flowing from the wiper of R401, through R402, to C403. As the voltage on the wiper of R401 increases, the current through R402 will increase and the discharge-to-charge ratio will tend to deteriorate. This problem is curcumvented by Q504 of the control tracking means. As the voltage on the wiper of R401 increases, the collector current of Q504 will increase. When Q301 is driven into conduction by the peak signal amplitude, the input to current amplifier 31 will be greater as will the discharge current of C403. In this manner not only the threshold but also the discharge-to-charge ratio of the automatic color level and control system is made to track the color level control.

Accordingly, an automatic color level control system with a threshold detector tracking the color control has been shown and described. The system allows the output of a DC controlled amplifier to vary linearly until a predetermined threshold level is reached. Once the level has been reached, the system operates to maintain the amplifier output at that level. Because the level is maintained by controlling the amplifier gain, little or no distortion is introduced into the controlled system. Furthermore, as the gain of the controlled amplitude is varied, e.g., by varying the DC control voltage, this threshold level is automatically varied in proportion. This allows the amplitude of the amplifier output to increase a given percentage over the nominal expected output without gain control action. Varying the threshold in proportion to the control voltage substantially maintains a fixed percentage of allowable increase regardless of the absolute signal level. Finally, the discharge-to-charge ratio of the system is made to be responsive to the control voltage so that more nearly constant performance is obtained over the entire range of control.

While there has been shown and described what is at present considered to be the preferred embodiment of the invention, it will be obvious to those skilled in the art that various changes and modifications may be made therein without departing from the invention as defined by the appended claims.

What is claimed is:

1. In a color television receiver, an automatic color level control system comprising:
   a DC-controlled amplifier having chrominance information for an input and an output coupled to the receiver's chrominance channel, said amplifier having a gain determined by the control voltage present at a control terminal;
   a detecting means responsive to the output signals of said DC-controlled amplifier having an amplitude greater than a predetermined threshold level; and
   a summing network comprising a variable control resistor and a discharge capacitor, said summing network providing said control voltage to the control terminal of said DC-controlled amplifier in proportion to the voltage on the wiper arm of said variable control resistor and the output of said detecting means, and
   a control tracking means having an input connected to said summing network and a first output coupled to said detecting means so that said pre-determined threshold level varies in accordance with said control voltage.

2. An automatic color level control tracking system as defined in claim 1, wherein said detecting means comprises two transistors in a differential configuration, said transistors sharing a total emitter current whose magnitude is dependent on a second output of said control tracking means.

3. An automatic color level control tracking system as defined in claim 2 wherein the amplitude of said second output of said control tracking means varies in accordance with said control voltage.

4. An automatic color level control tracking system as defined in claim 3 wherein the amplitude of said second output varies so as to maintain a relatively constant discharge-to-charge ratio in accordance with said control voltage.

5. An automatic color level control tracking system as defined in claim 1 wherein said detecting means provides an output pulse of current to said summing network, the amplitude of said output pulse varying in accordance with said control voltage.

6. An automatic color level control tracking system as defined in claim 5 wherein said output pulse of current discharges said discharge capacitor so as to maintain the output of said DC-controlled amplifier at a level substantially determined by said pre-determined threshold level.

7. An automatic color level control tracking system as defined in claim 2 wherein the ratio of the amplitudes of said first and second outputs is substantially fixed.

8. An automatic color level control system as defined in claim 1, wherein said input of said control tracking means is connected to said variable control resistor of said summing network so that said pre-determined threshold level varies in accordance with the resistance of said variable control resistor.

9. An automatic color level control system as defined in claim 8, wherein said summing network further comprises a threshold adjust means, said input of said control tracking means connected to said variable control resistor through said threshold adjust means so that said pre-determined threshold level varies in accordance with said threshold adjust means.

10. In a color television receiver, an automatic level control system comprising:

a DC-controlled amplifier having chrominance information for an input and an output coupled to the receiver's chrominance channel, said amplifier having a gain determined by the control voltage present at a control terminal;

a detecting means for providing an output pulse of current in response to output signals of said DC-controlled amplifier having an amplitude greater than a pre-determined threshold level, the amplitude of said output pulse of current varying in accordance with said control voltage;

a summing network comprising a variable control resistor and a discharge capacitor, said summing network providing said control voltage in proportion to the voltage on the wiper arm of said variable control resistor and the output of said detecting means; and a control tracking means having an input connected to said summing network, said control tracking means having a first output coupled to said detecting means so that said pre-determined threshold level varies in accordance with said control voltage and a second output coupled to said detecting means so as to maintain a relatively constant discharge-to-charge ratio.

11. An automatic color level control tracking system as defined in claim 10 wherein the amplitude of said second output of said control tracking means varies in accordance with said control voltage.

12. An automatic color level control tracking system as defined in claim 11 wherein the ratio of the amplitudes of said first and second outputs is substantially fixed.

13. An automatic color level control tracking system as defined in claim 10, further comprising a fixed-gain amplifier interposed between said DC-controlled amplifier and said detecting means, said fixed-gain amplifier having a quiescent differential output voltage so as to substantially establish said predetermined threshold level.

14. An automatic color level control tracking system as defined in claim 13 wherein said fixed-gain amplifier comprises a differential stage having one collector connected to said first output of said control tracking means.

* * * * *